US008310490B2

(12) United States Patent
Zaczek et al.

(10) Patent No.: US 8,310,490 B2
(45) Date of Patent: Nov. 13, 2012

(54) DISPLAY FOR INFORMATION STORAGE MODULE

(75) Inventors: Thomas Edward Zaczek, Louisville, CO (US); Frederick Graves Munro, Broomfield, CO (US); Jamie Mark Stiger, Arvada, CO (US); McClain Marshall Buggle, Broomfield, CO (US); William Edward Dunphy, Erie, CO (US)

(73) Assignee: Tandberg Data Corporation, Boulder, CO (US)

( * ) Notice: Subject to any disclaimer, the term of this patent is extended or adjusted under 35 U.S.C. 154(b) by 839 days.

(21) Appl. No.: 12/473,913

(22) Filed: May 28, 2009

(65) Prior Publication Data

US 2010/0302262 A1 Dec. 2, 2010

(51) Int. Cl.
*G06F 13/14* (2006.01)
(52) U.S. Cl. ........................................ 345/520
(58) Field of Classification Search .................. 345/520
See application file for complete search history.

(56) References Cited

U.S. PATENT DOCUMENTS

| 6,128,698 | A | 10/2000 | Georgis |
| 6,389,503 | B1 | 5/2002 | Georgis et al. |
| 2003/0138325 | A1 | 7/2003 | Su |
| 2004/0194154 | A1 | 9/2004 | Meadors et al. |
| 2006/0010285 | A1 | 1/2006 | Georgis |
| 2006/0010458 | A1 | 1/2006 | Georgis |
| 2006/0101197 | A1 | 5/2006 | Georgis et al. |
| 2006/0103966 | A1 | 5/2006 | Georgis |
| 2009/0310253 | A1 | 12/2009 | Georgis |
| 2010/0042996 | A1* | 2/2010 | Corry et al. ............ 718/100 |

FOREIGN PATENT DOCUMENTS

| JP | 2006-268929 A | 10/2006 |
| KR | 10-2006-0011167 A | 2/2006 |

OTHER PUBLICATIONS

International Search Report and Written Opinion mailed Dec. 29, 2010 in PCT application PCT/US2010/001504.

* cited by examiner

*Primary Examiner* — Jeffrey Chow
(74) *Attorney, Agent, or Firm* — Nixon & Vanderhye, P.C.

(57) ABSTRACT

A computer memory system (20) which comprises a media module (22); a host computer (24) configured to accommodate the media module (22) in removable fashion; and a display unit (26). The media module (22) is configured to store electronic data. The host computer (24) comprises a docking station (30) configured to accommodate the media module (22); an interface (32) through which electronic signals representing the electronic data are transmitted between the host computer (24) and the media module (22); an optical indicator (34); and a host processor (36). The host processor (36) is configured to control a read/write operation over the interface between the host computer (24) and the media module (22) and to activate the optical indicator (34) whereby the optical indicator (34) provides a first optical signal depicting transmission of electronic signals over the interface in the read/write operation. The host processor (36) is further configured to drive the optical indicator (34) whereby the optical indicator provides a second optical signal modulated to represent media module management information which can be displayed upon an output display device (52).

25 Claims, 8 Drawing Sheets

DISPLAY FOR INFORMATION STORAGE MODULE

BACKGROUND

I. Technical Field

This invention pertains to information storage, and particularly to information storage devices or units which incorporate or include media modules such as cartridges or cassettes of information storage media.

II. Related Art and Other Considerations

Most computer systems have on-board memory in the form of, e.g., random access memory (RAM) or read only memory (RAM) chips which are mounted on a circuit board or the like within a cabinet or frame of the computer. Many computer systems also have access to additional memory in the form of electronic (e.g. magnetic) media which is stored in a removable unit or media module such as cassette or cartridge. The removable media module can be inserted into a slot or port or rack of the computer frame in order to facilitate input/output operations of data (e.g., recording and reproduction of data in the form of signals written to or read from the storage media).

One type of storage media module of recent interest is an RD®-type cartridge which comprises a disk drive mounted in a sealed exterior cartridge. The disk drive is a laptop-style 2.5-inch disk drive, which has built-in accelerometers, head ramp unloading, and other features that makes it more tolerant of shock and vibration than their 3.5-inch counterparts. The cartridge can be inserted into an external USB or internal SATA dock that locks the cartridge in place under software control so the user cannot remove a cartridge undergoing a recording operation. The RDX®-type cartridge has a SATA interface connector that provides the power and data communication interface between the hard disk drive and a docking station. The RDX®-type cartridge has a plastic cartridge shell and internal shock isolation material around the hard disk drive to provide a shock-mounting system. The cartridge has no other electronics besides that in the hard disk drive. There is a light pipe that takes light from an LED in the docking station and pipes to the front surface of the cartridge for the user to see while the cartridge is plugged in the dock. This is a bi-color LED that shows read/write activity with the disk and status.

A Lexmark Jump drive a USB flash memory stick has a capacity bar graph display which obtains the information to be displayed through the native host USB interface in the product, but not through a separate optical link.

It can be problematic to identify media modules such as cartridges when the media modules are not loaded into a host system, e.g., when the media modules are extracted from the computer system and situated externally for storage while not in use. A primitive way of identifying a storage media module is to provide a legible label to a prominent surface of the media module. That is, for identification purposes existing prior art modules typically only have a paper bar graph label or serial number on the module.

BRIEF SUMMARY

In one of its numerous aspects the technology disclosed herein concerns a computer memory system which comprises a media module; a host computer configured to accommodate the media module in removable fashion; and a display unit. The media module is configured to store electronic data. The host computer comprises a docking station configured to accommodate the media module; an interface through which electronic signals representing the electronic data are transmitted between the host computer and the media module; an optical indicator; and a host processor. The host processor is configured to control a read/write operation over the interface between the host computer and the media module and to activate the optical indicator. When activated, the optical indicator provides (not over the first interface) a first optical signal depicting transmission of electronic signals over the interface in the read/write operation. The host processor is further configured to drive the optical indicator whereby the optical indicator provides a second optical signal modulated to represent media module management information.

The display unit of the system comprises an optical receiver; an output display device; and a display unit processor. The optical receiver is configured to receive the second optical signal. The output display device configured to provide a visible representation of the media module management information. The display unit processor configured to interpret the second optical signal and to display the media module management information derived there from on the output display device.

In an example embodiment the display unit further comprises a memory, and wherein the display unit processor is further configured to store the media module management information derived from the second optical signal in the memory and (upon request) to drive the output display device with the media module management information obtained from the memory.

An example embodiment further comprises light transmission means (e.g., a light pipe) for transmitting the second optical signal from the optical indicator to the optical receiver.

In an example embodiment the optical indicator comprises a light emitting diode (LED).

In some example embodiments the display unit is connected to the media module. For example, n an example embodiment the display unit attaches as a separate unit to the media module. In an alternate example embodiment the display unit is integrally incorporated into the media module.

In some example embodiments the display unit is connected to the host computer. For example, in one embodiment the display unit is situated in a second docking station of the host computer.

In an example embodiment the display unit comprises an independent power supply. In an alternate example embodiment the display unit is configured to obtain power supply from the host computer.

In an example embodiment the media module management information comprises at least one of (1) remaining capacity of the media module; (2) name of the media module; (3) a job name; (4) a date of access of the media module; (5) operational status of the media module; (6) total capacity of the media module; and (7) one or more barcodes. The barcode(s) can represent one or more of (1)-(6).

In an example embodiment the media module comprises a media module frame which carries a disk memory device, such as a disk drive or a solid state disk.

In another of its aspect the technology disclosed herein concerns a media module. The media module comprises a media module frame; a memory device configured to store electronic data; and a display unit. The display unit is connected to the media module and comprises an optical receiver; an output display device; and a display unit processor. The optical receiver is configured to receive from a host computer an optical signal modulated to represent media module management information. The output display device is configured to provide a visible representation of the media module management information. The display unit processor is configured to interpret the optical signal and to display the media module management information derived there from on the output display device.

In another of its aspects the technology disclosed herein concerns a display unit for use with a media module of a type which stores electronic data. The display unit comprises an optical receiver; an output display device; and a display unit processor. The optical receiver is configured to receive from a host computer an optical signal modulated to represent media module management information. The output display device is configured to provide a visible representation of the media module management information. The display unit processor is configured to interpret the optical signal and to display the media module management information derived there from on the output display device. In some example embodiments the display unit is connected to or connectable to the media module. In other example embodiments the display unit is connectable to the host computer. For example, in an example embodiment the display unit comprises a frame which is insertable into a docking station of the host computer.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

Figure 1:
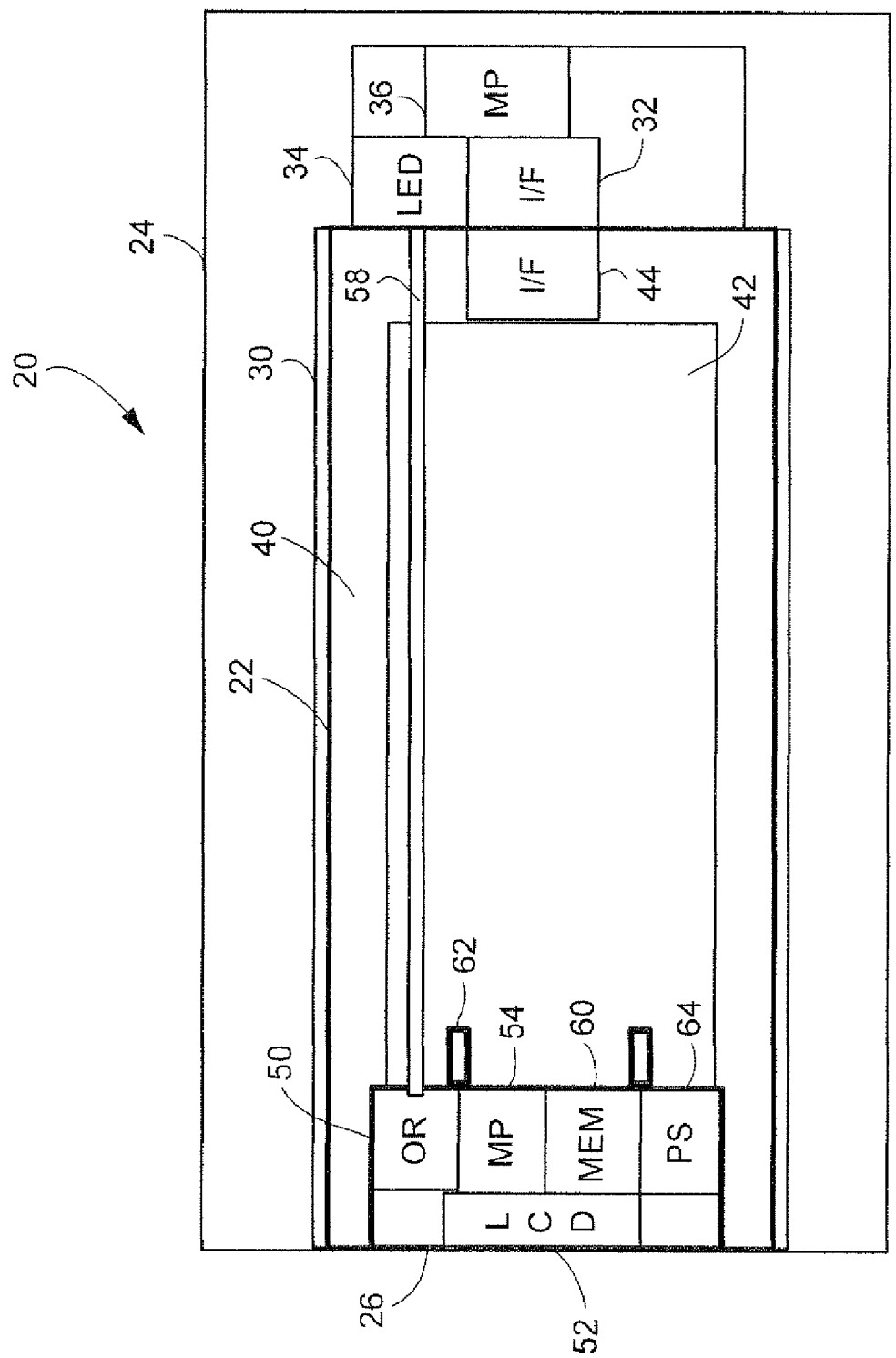
FIG. 1 is a top schematic view of an example embodiment of a computer memory system comprising a media module, a host computer, and a display unit, and wherein the display unit is a separate unit which is attachable to the media module.

FIG. 1 shows an example embodiment of a computer memory system 20 which comprises media module 22; host computer 24 configured to accommodate the media module 22 in removable fashion; and display unit 26. The media module 22 is configured to store electronic data, and can be any type of media module such as a cassette or cartridge, for example, which stores or accommodates an information storage medium wherein information is recordable and reproducible either electronically, magnetically, or optically.

The host computer 24 comprises a docking station 30 configured to accommodate the media module 22; an interface/connector 32 through which electronic signals representing the electronic data are transmitted between host computer 24 and media module 22; optical indicator 34; and host processor 36. The host computer 24 can be any type of computer/processor-based or computer/processor-utilizing device, such as a desktop type computer or even a media storage drive that fits into or connects to a computer.

Figure 2:
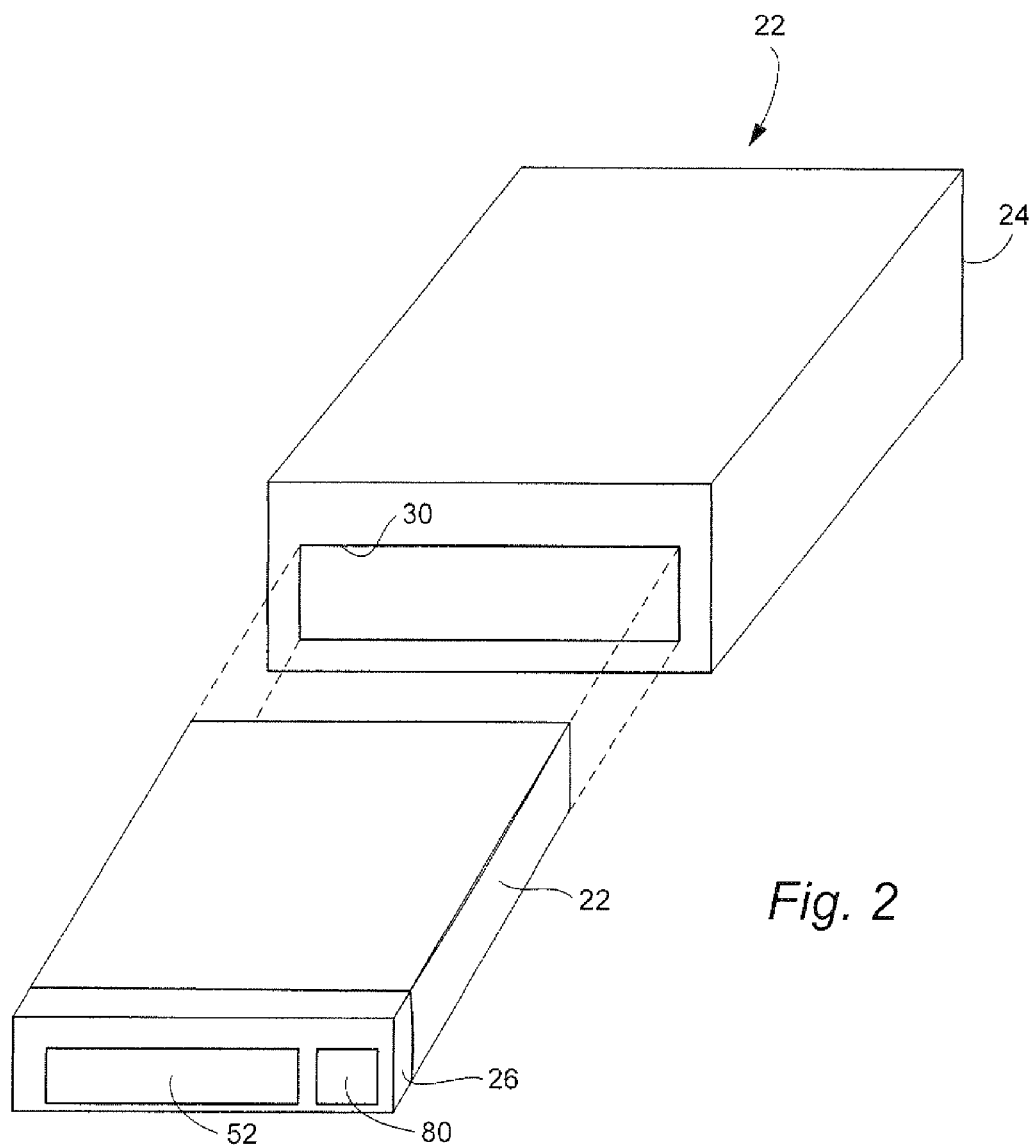
FIG. 2 is an isometric exploded view showing removability of a media module with respect to a host computer in an example embodiment wherein the media module comprises a display unit connected thereto.

In an example embodiment the docking station 30 essentially takes the form of an internal cavity or bay provided within a frame or cabinet of the computer memory system 20. The docking station can be, for example, a particular slot in a host cabinet that accommodates plural adjacent slots, such as slots for disk drive units and the like. The docking station 30 is sized to accommodate internally the media module 22. FIG. 2 illustrates how the media module 22 of the first embodiment can be inserted into and removed from an example docking station of host computer 24.

The host processor 36 executes coded instructions in the form of one or more computer programs to control a read/write operation over the interface between the host computer and the media module. In other words, the host processor 36 controls the transmission of electronic signals representing the electronic data as such electronic data is recorded on or reproduced from the media module 22. In addition, host processor 36 activates optical indicator 34 as so to provide a first optical signal depicting transmission of electronic signals over the interface in the read/write operation. The first optical signal can be the usual blinking of optical indicator 34 that occurs during a read or write operation to illustrate the occurrence of signal transmission between media module 22 and host computer 24.

In addition, host processor 36 is configured to drive optical indicator 34 so that optical indicator 34 provides a second optical signal. The second optical signal, rather than being an arbitrary or regularly activated signal, is modulated or coded to represent media module management information. In an example embodiment the media module management information comprises one or more of (1) remaining capacity of the media module; (2) name of the media module; (3) a job name; (4) a date of access of the media module; (5) operational status of the media module; (6) total capacity of the media module; and (7) one or more barcodes. The barcode(s) can represent one or more of (1)-(6).

In an example embodiment the media module 22 comprises media module frame 40. The media module frame 40 in turn internally accommodates or carries an information storage device or media, such as a disk memory device 42. The disk memory device 42 can be a disk drive or a solid state disk. Although unillustrated in FIG. 1, it will be appreciated that media module 22 typically comprises a circuit board or the like upon which various components (e.g., electronic components) are positioned, including an interface/connector 44 which connects media module 22 to host computer 24.

Display unit 26 is connected to media module 22 and comprises optical receiver 50; output display device 52; and display unit processor 54. The optical receiver 50 is configured to receive the second optical signal. Reception of the second optical signal by optical receiver 50 can occur by virtue of optical alignment of optical receiver 50 with optical indicator 34, or by conduction of the second optical signal from optical indicator 34 to optical receiver 50 through an optical transmission medium. In an example embodiment, such an optical transmission medium can take the form of light pipe 58. A first end of light pipe 58 is positioned near or connected to optical indicator 34; a second end of light pipe 58 is positioned near or connected to optical receiver 50.

The output display device 52 is configured to provide a visible representation of the media module management information. The 52 can take the form of a liquid crystal display, for example. The display unit processor 54 serves, e.g., to interpret the second optical signal and to display the media module management information derived there from on output display device 52.

In an example embodiment display unit 26 further optionally comprises memory 60. When a memory such as memory 60 is provided, display unit processor 54 is further configured to store the media module management information derived from the second optical signal in memory 60 and (upon request) to drive the output display device 52 with the media module management information obtained from memory 60. Preferably memory 60 is a non-volatile memory.

Figure 3:
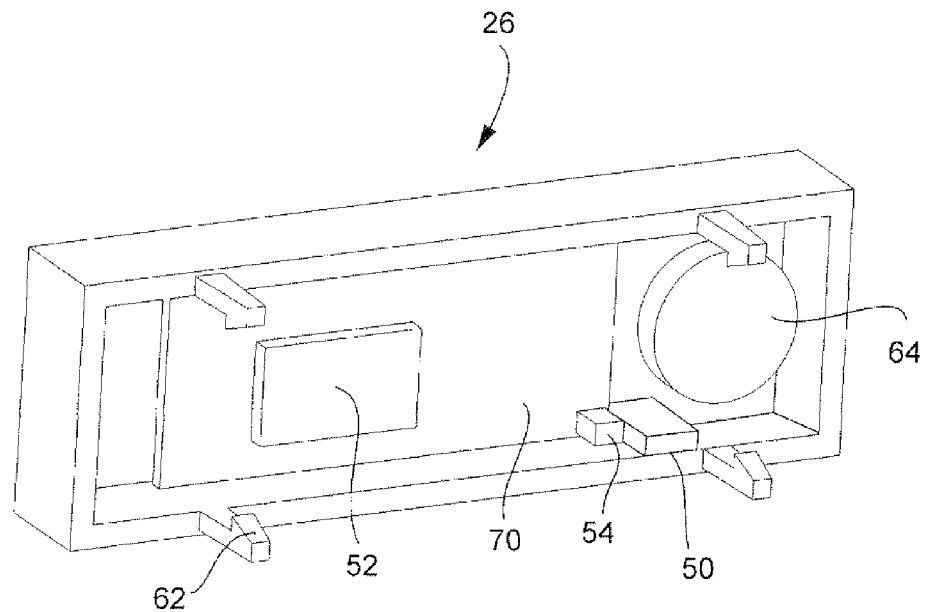
FIG. 3 is a rear perspective view of a media module with a clip-on display unit according to a first example embodiment.

In an example embodiment such as that illustrated in FIG. 1, display unit 26 attaches as a separate unit to media module 22. For example, display unit 26 can be attached to a face of media module 22 which, upon insertion of media module 22 into docking station 30, is oriented toward the mouth or opening of docking station 30, and thus is the trailing face of media module 22 as media module 22 is inserted into docking station 30. In the example embodiment, display unit 26 is provided with means for attaching a frame of display unit 26 to media module 22. The attaching means can take the form of one or more resilient clips 62 positioned to engage corresponding notches or recesses on a frame of media module 22. Clipping on the front of the media module in the manner of the example embodiment of FIG. 1 has the benefit in that the entire installed base of media modules can accept this product. The display unit 26 of the example embodiment of FIG. 1 is thus further illustrated in FIG. 3 (rear of the clip-on display unit) and FIG. 4 (front of the clip-on display unit). FIG. 3 particularly shows the display unit as comprising circuit board 70. The circuit board 70 can have mounted thereon the output display device 52 (a rear surface of which is shown in FIG. 3) and display unit processor 54. In the example embodiment in which media module 22 attaches as a separate unit, display unit 26 comprises an independent power supply 64 (see FIG. 1 and FIG. 3). The power supply 64 can take the form of a battery, for example. The light pipe 58 serves to direct both the first optical signal and the second optical signal both to optical receiver 50 (see FIG. 4) and to window 74 (see FIG. 4).

Figure 5:
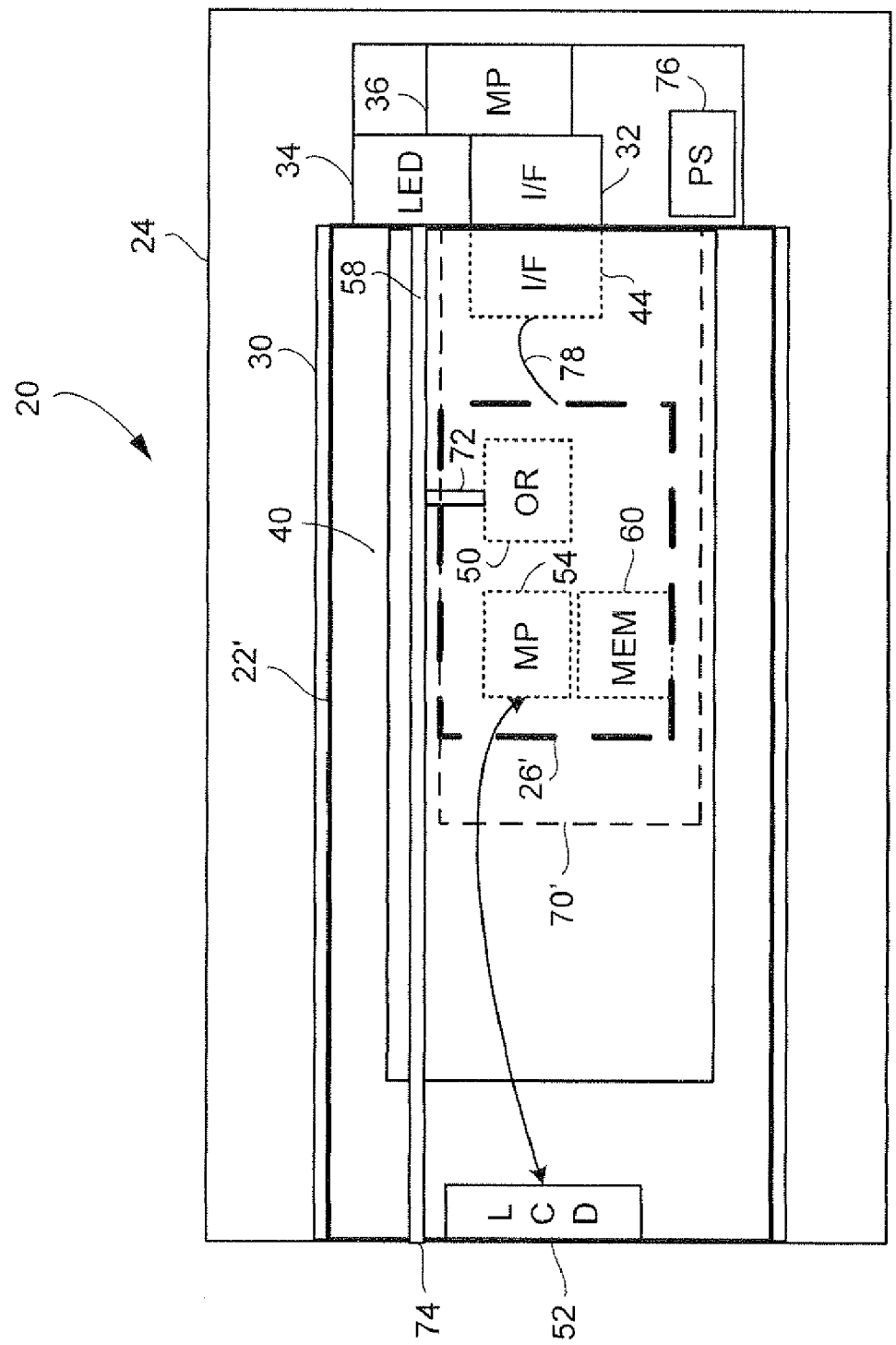
FIG. 5 is a top schematic view of an example embodiment of a computer memory system comprising a media module, a host computer, and a display unit, and wherein the display unit is an integral part of the media module.

FIG. 1 thus shows an example embodiment wherein display unit is attached to media module 22 as a separate and independent unit. In an alternate example embodiment shown in FIG. 5, display unit 26' is connected to the media module by being integrally incorporated into media module 22'. For example, some or all of the constituent components of display unit 26' can reside on a circuit board 70' (e.g., mother board or the like) that resides in or is positioned on media module 22'. In the example embodiment of FIG. 5 the circuit board 70' is positioned on a bottom side of media module 22', for which reason circuit board 70' and elements mounted thereon are illustrated by broken lines in FIG. 5. For example, FIG. 5 shows optical receiver 50, display unit processor 54, and memory 60 (as well as interface/connector 44) residing on circuit board 70. In the integral embodiment of FIG. 5, the processor which serves as display unit processor 54 can also perform other functions for media module 22'.

The FIG. 5 further shows that light pipe 58 can have a light pipe branch 72 which directs at least a portion of the second optical signal emanating from optical indicator 34 to optical receiver 50. A primary segment of light pipe 58 has a first end connected to optical indicator 34 and a second end exposed or connected to a window 74 formed on a face of media module 22'. In this second embodiment the light pipe 58 thus serves to direct both the first optical signal and the second optical signal both to optical receiver 50 and to window 74. In other words, light pipe 58 may work sufficiently to route some light to the optical receiver 50, a small Y branch off light pipe 58 such as light pipe branch 72 can be provided to route the light to optical receiver 50. The light pipe branch 72 also reduces the chance of unwanted interference from a strong light in the environment coming in the reverse direction.

In the second example embodiment illustrated in FIG. 5 circuit board 70' can obtain power supply from the host computer, e.g., be connected to receive power from host power supply 76 through interface/connector 44 as indicated by power lead 78. It will be appreciated that in other example embodiments the power to circuit board 70' can be obtained from the host computer via another or second connected, e.g., a smaller power connector which connects the circuit board 70 ultimately to a power source of the host computer.

Although showing a media module 22 of the first example embodiment, FIG. 2 also illustrates how the media module 22' of the second embodiment can be inserted into and removed from host computer 24. FIG. 2 also shows an example format of a front bezel or panel of display unit 26, including positioning of output display device 52 as well as an optional start/stop scrolling button or switch 80. Upon activation of switch 80, the display unit processor 54 fetches the media module management information from memory 60 and prompts display of some or all of the elements of media module management information on output display device 52.

Figure 6:
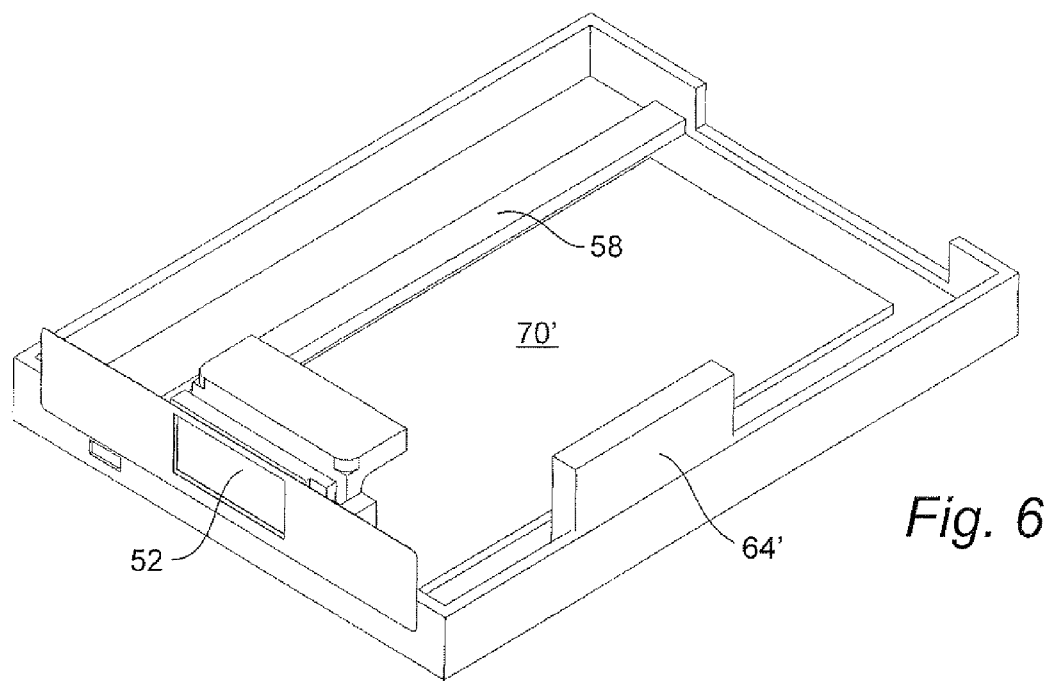
FIG. 6 is a perspective view of a frame of a media module without a memory device and with a frame top removed.

It has already been mentioned that, in an example embodiment, the media module comprises a media module frame 40, and that media module frame 40 in turn internally accommodates or carries an information storage device or media, such as a disk memory device 42. FIG. 6 shows, in the example context of the second embodiment of FIG. 5, a modified media module frame or shell with the drive and top cover removed. FIG. 6 particularly illustrates output display device 52, media module electronics board 70'; battery 64'; and light pipe 58. The electronic components residing on media module electronics board 70' are not shown in FIG. 6, but are depicted in FIG. 5.

Figure 7:
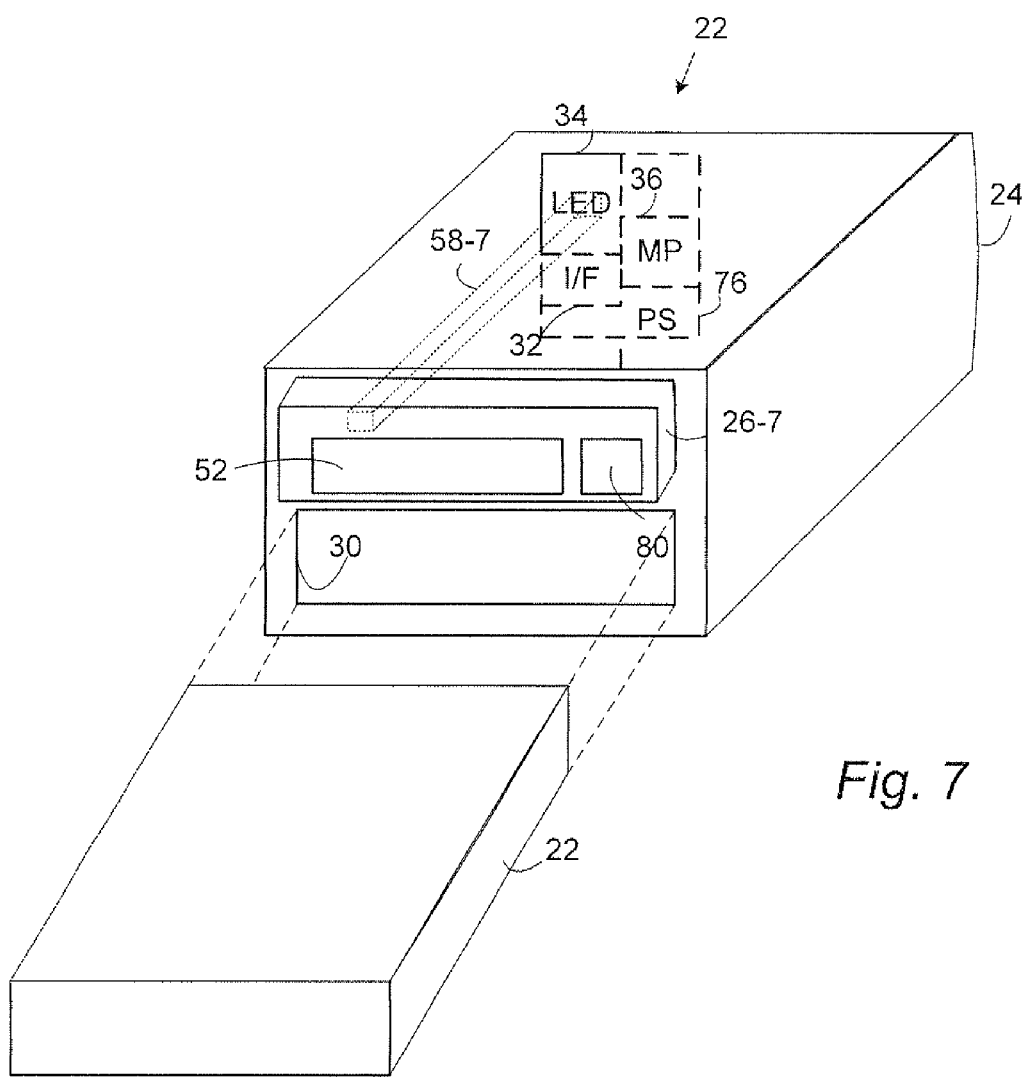
FIG. 7 is an isometric exploded view showing removability of a media module with respect to a host computer in an example embodiment wherein a display unit is connected to a host computer.

The preceding example embodiments illustrate the display unit as being connected to the media module. In yet other example embodiments the display unit can instead be mounted near the media module, e.g., connected to or mounted on the host computer (which includes a frame support peripherals connected to the host computer). In one example implementation shown in FIG. 7, the display unit 26-7 is connected to a surface an exterior of a cabinet or frame for the host computer 24. FIG. 7 particularly shows the display unit 26-7 as being mounted on a front surface or front panel of host computer 24, and adjacent (e.g., above) the docking station 30 which accommodates the media module 22-7.

Figure 4:
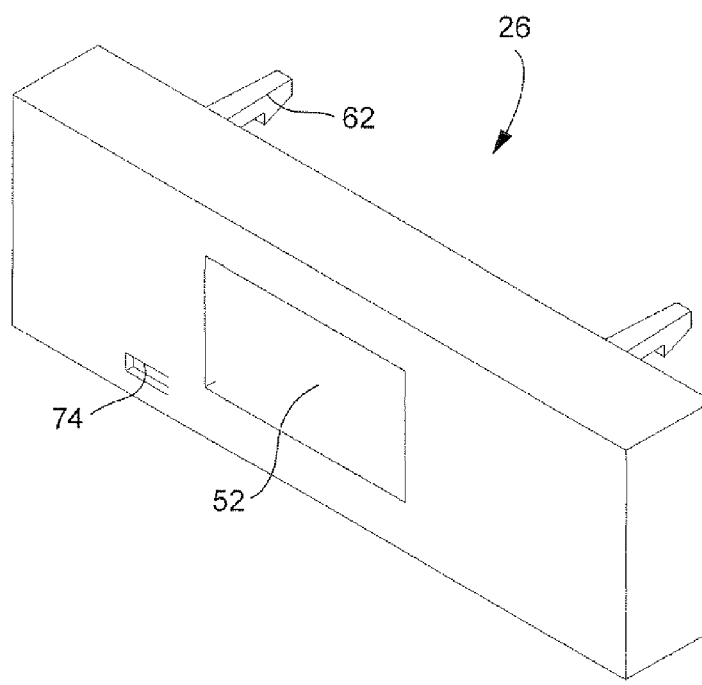
FIG. 4 is a front view of the media module with the clip-on display unit of FIG. 3.

The display unit 26-7 of FIG. 7 can be essentially modular or self-contained in similar manner as shown in FIG. 3 and FIG. 4, but attaches to the host computer 24 instead of to the media module 22-7. The display unit 26-7 can be attached to host computer 24 by any suitable means, such as screws or fasteners which penetrate the frame or cabinet of host computer 24. Alternatively, display unit 26-7 can be attached or secured to host computer 24 by other means such as Velcro type fasteners, double-sided adhesive(s), epoxy adhesive(s), magnets, or the like. As shown in FIG. 7 the display unit 26-7 connects to a light pipe 58-7 for communication and reception of the second optical signal. The light pipe 58-7 of FIG. 7 can connect back to the board of the host computer 24 which carries the optical indicator 34, or be spliced into or coupled to another light pipe (e.g., a light pipe serving the media module 22-7) that connects to the optical indicator 34. A distal end of the light pipe 58 serving and connected to the display unit 26-7 preferably extends through a hole or aperture formed in the frame or cabinet of the host computer 24. The display unit 26-7 can have its own battery, or be connected to a power source 76 of the host computer 24. If connected to the host computer power source, a power connector extends through a hole or aperture in a cabinet wall or frame of the host computer to connect to the display unit 26-7.

Figure 8:
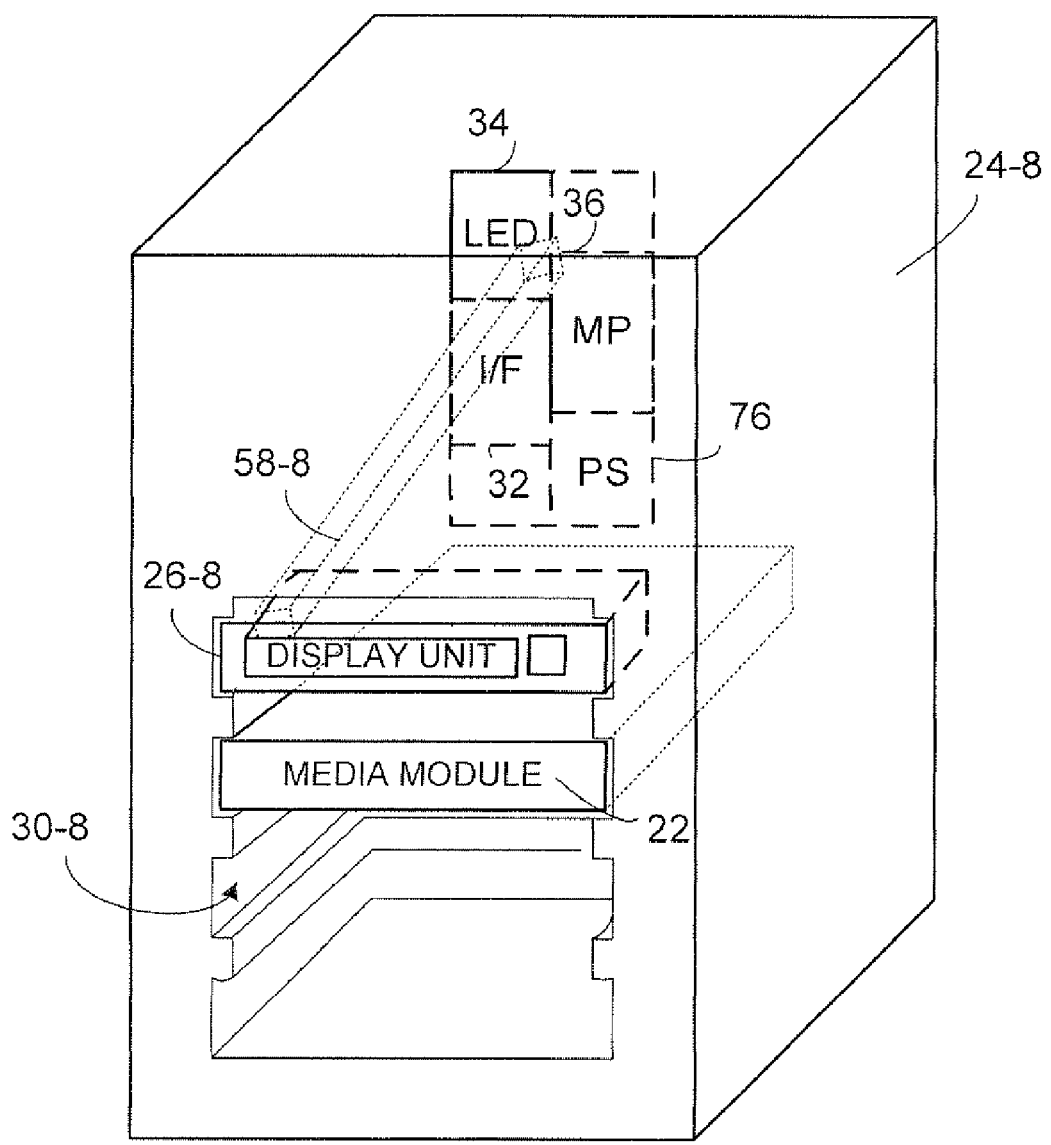
FIG. 8 is an isometric exploded view showing removability of a media module with respect to a host computer in another example embodiment wherein a display unit is connected to a host computer.

FIG. 8 illustrates another example embodiment wherein display unit 26-G is mounted near the media module, e.g., connected to or mounted on the host computer. In particular, FIG. 8 shows display unit 26-G as being situated in docking station 30-G which takes the form of a slot or rack of a accessory (e.g., peripheral) mounting area of the host computer. In the example illustrated embodiment of FIG. 8, the docking station 30-G happens to have four bays or slots for reception of peripheral devices or computer accessories. FIG. 8 shows that the media module 22 is situated in a second-from-the-top bay and has its lower surface riding on sleds of the second-from-the-top bay. FIG. 8 further shows that the display unit 26-G that is associated with media module 22 is situated in a top-most bay of docking station 30, and thus rides on the sleds of the uppermost bay. Whereas the media module 22 may occupy a preponderance of its bay, in an example implementation the display unit 26-G need not occupy its entire bay. For example, the display unit 26-G can be essentially similar (e.g., in size and configuration) to the display unit 26 of FIG. 2 and FIG. 3, but with side panels or flanges that are sized and/or configured to engage the sled-grooved inner wall of docking station 30 in its bay in such a manner that display unit 26-G is retained within the bay.

FIG. 8 also shows that the display unit 26-G is positioned so that its optical receiver connected to a distal end of light pipe 58-G. As in the embodiment of FIG. 7, the light pipe 58-G can connect back to the board of the host computer 24-G which carries the optical indicator 34, or be spliced into or coupled to another light pipe (e.g., a light pipe serving the media module) that connects to the optical indicator 34. The display unit 26-G can have its own battery, or be connected to a power source 76 of the host computer 24-G.

The embodiments of display modules which are connected to the host computer, such as display unit 26-7 and display unit 26-G, are particularly suited for a media module which essentially remains connected to the host computer for a long period of time, e.g., for the useful life of the media module or until system upgrade. In some embodiments the media modules may be interchanged or swapped more frequently, in which case it is more beneficial to have the display unit connected to the removable media module so that the media module management information can be read or displayed while the media module is remote from the host computer.

Figure 9:
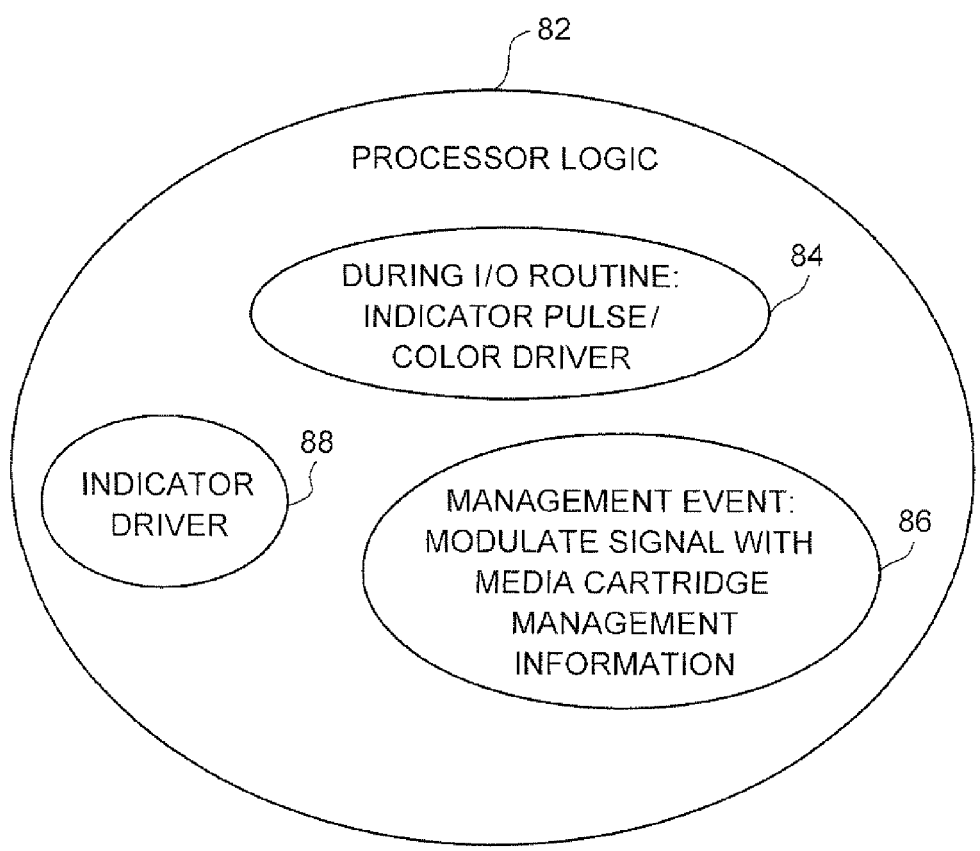
FIG. 9 is a diagrammatic view showing various logic routines of a host processor.

FIG. 9 schematically depicts portions of logic routines 82 executed by host processor 36. Among the various routines executed by host processor 36 are indicator pulse/color routine 84; indicator modulation routine 86; and indicator driver 88. The indicator pulse/color routine 84 is executed during an input/output operation (e.g., recording electronic signals to or reproducing electronic signals from the media module 22), and results in generation of the first optical signal which depicts transmission of electronic signals over the interface in the read/write operation. In a first example implementation the first optical signal can essentially take the form of a uniform pulse train that indicates only the existence of the I/O operation. In a first example implementation in which the optical indicator 34 is a bi-color LED, the first optical signal can essentially take the form of a signal that changes the display of the bi-color LED so that a color indicative of the I/O operation is radiated from optical indicator 34.

The indicator modulation routine 86 is executed during any designated or periodic management event, such as completion of an I/O operation, a determination of changed capacity of the media module, or a status change of the media module (e.g., detection of an error), for example. Execution of the indicator modulation routine 86 results in generation of the second optical signal, which is modulated (e.g., encoded) to represent media module management information.

The indicator driver 88 can activated by either indicator pulse/color routine 84 or indicator modulation routine 86. As indicated above, indicator driver 88 is activated by indicator pulse routine 84 during performance of an input/output operation; indicator driver 88 is activates by indicator modulation routine 86 upon occurrence of a management event.

Thus, in embodiments described herein an existing optical indicator in a computer or computer memory system, such as an LED activity indicator for the disk memory device (that is controlled by software), is additionally employed to send display information (e.g., media module management information) from the host to a display mounted on, in, or near the media module. The media module can be a RDX®-type product, but also could be applied to any computer disk system (e.g., hard disk drive or solid state disk, as non-limiting examples) that has an activity LED driven by software.

The display (such as output display device 52) is employed to show information valuable to the user, e.g. media module management information. The display can remain fixed to the main system or removable with the media module (e.g., in an RDX® approach).

As indicated above, the media module management information can include such information as: (1) remaining capacity; (2) name of the disk or media module (e.g., "marketing backup", "Disk 10", etc); (3) job name (e.g., "Tuesday's backup"); (4) last usage date; (5) operational status; (6) total capacity of the media module; and (7) one or more barcodes. The barcode(s) can represent one or more of (1)-(6)

If the display unit is on the media module and the media module is removable, this has value to the user when he has several media modules stored away from their powered docking stations and select the appropriate media module based upon the media module management information on the media module.

The technology disclosed herein uses the light from the LED in the docking station to communicate to some new additional electronics added to the media module or near the media module or frame for the purposes of programming a display, and storing that information in the display unit 26 (in a solid-state non-volatile memory, for example) for display later when the media module is away from the docking station or host. The display itself may provide the non-volatile memory storage. This requires electronics for driving the display and new software in the docking station to control the LED for display communication purposes. The value of this approach is that it allows provision of a new "display-enabled" media module into a large installed base of docking stations or host computers by only changing the firmware of the docking stations or host computers.

The LED usage for communication is shared with the embedded software application's usage, with the sharing configured so that no conflicts are created.

For a general case involving a system with hard drives and activity indicators, the sharing of the activity LED for communication of media module management information would be under control of host processor 36. The communication protocol facilitated by host processor 36 would tolerate interruption and include error detection. Since the display electronics cannot acknowledge the receipt of data due to the one-way nature of this system, redundant copies of the information can be sent (e.g., to light emitting diode 60) to assure display reliably.

The information required for a display update (e.g., to update 52) is expected to be relatively small (on the order of 10 to 100 Kbytes) and does not need continual refresh, so that small packets of display data can be sent when the activity indicator is not in use.

The technology disclosed herein encompasses addition of electronics internal to the media module (e.g., in the manner of the example embodiment of FIG. 5) or addition of electronics external to the media module (e.g., in the manner of the example embodiment of FIG. 1 wherein display unit 26 clips on the front of the media module 22).

For viewing the display output display device 52 of display unit 26 when the display unit 26 is removed from docking station 30 (as shown in FIG. 2), the display system can comprise internal power source or not depending upon the type of display employed. Standard LCD displays may require a power source so the user can view the display away from the docking station. The power source can be, for example, a battery or solar. Bi-stable Cholesteric (BCD) displays such, as those from Kent which are licensed to Varitronix and e-ink require zero power once they are written. (http://www.eink-.com/index.html).

If a non-BCD display, the user can activate the power source for the display through a button (e.g., handover unit 80), or an internal accelerometer could be employed to turn on the display when the media module is moved.

Thus, in one of its non-limiting aspects the technology disclosed herein concerns an embodiment of a display unit 26 (see FIG. 1) which clips on the front of a disk module or media module 22 and takes the light from an activity indicator to drive the display. A programmed software product that includes instructions coded on computer-readable media (e.g., indicator modulation routine 86) drives the activity LED to communicate with the output display device 52 upon receipt by optical receiver 50. The software (e.g., indicator modulation routine 86) is configured to decide what media module management information to display on output display device 52 and how to modulate the second optical signal for transmission of electronic signals indicative of the media module management information. As an alternative, an interface can be provided so that other software products communicate with output display device 52 through media module frame 40.

The technology disclosed herein encompasses system builders for providing a computer memory system that employ disk memory devices, such as a hard disk drives and solid state disks, without having to modify their hardware. The product could be an add-on or it could be integrated into the disk module packaging.

As described herein, an optical indicator such as optical indicator 34 is driven to provide a second optical signal which can be modulated or coded to represent media module management information. As a variation in some embodiments the communication between the host and the display unit can be duplex communication. That is, the information can also be provided from the display unit to the host. Such return communication from the display unit to the host can, at least in an example implementation, take the form of an LED or optical indicator provided on the display unit and which transmits modulated or coded information on a return optical signal to a receptor at the host. The return optical signal can be carried on a separate light pipe than the light pipe which carries the second optical signal to the display unit. Alternatively, with suitable couplings at each end a same light pipe can be utilized to transmit the second optical signal and the return optical signal. The duplex communication can be in accordance with a pre-established protocol or signal gating/timing so that the host and display unit will know, e.g., in what sequence to expect certain signals or information.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A computer memory system comprising:
    a media module configured to store electronic data;
    a host computer comprising:
        a docking station configured to accommodate the media module in removable fashion;
        an interface through which electronic signals representing the electronic data are transmitted between the host computer and the media module;
        an optical indicator;
        a host processor configured to control a read/write operation over the interface between the host computer and the media module and to activate the optical indicator whereby the optical indicator provides a first optical signal depicting transmission of electronic signals over the interface in the read/write operation, the host processor further being configured to drive the optical indicator whereby the optical indicator provides a second optical signal modulated to represent media module management information, the first optical signal and the second optical signal not being transmitted over the interface;
    a display unit comprising:
        an optical receiver configured to receive the second optical signal;
        an output display device configured to provide a visible representation of the media module management information;
        a display unit processor configured to interpret the second optical signal and to display the media module management information derived there from on the output display device;
    wherein the display unit further comprises a memory, and wherein the display unit processor is further configured to store the media module management information derived from the second optical signal in the memory and upon request to drive the output display device with the media module management information obtained from the memory.

2. The computer memory system of claim 1, further comprising light transmission means for transmitting the second optical signal from the optical indicator to the optical receiver.

3. The computer memory system of claim 1, wherein the optical indicator comprises a light emitting diode (LED).

4. The computer memory system of claim 1, wherein the display unit is connected to the media module.

5. The computer memory system of claim 4, wherein the display unit attaches as a separate unit to the media module.

6. The computer memory system of claim 4, wherein the display unit is integrally incorporated into the media module.

7. The computer memory system of claim 1, wherein the display unit is connected to the host computer.

8. The computer memory system of claim 1, wherein the display unit is situated in a second docking station.

9. The computer memory system of claim 1, wherein the display unit comprises an independent power supply.

10. The computer memory system of claim 1, wherein the display unit is configured to obtain power supply from the host computer.

11. The computer memory system of claim 1, wherein the media module management information comprises at least one of (1) remaining capacity of the media module; (2) name of the media module; (3) a job name; (4) a date of access of the media module; (5) operational status of the media module; (6) total capacity of the media module; and (7) one or more barcodes.

12. The computer memory system of claim 1, wherein the media module comprises a media module frame which carries a disk memory device.

13. A media module comprising:
    a media module frame;
    a memory device configured to store electronic data;
    a display unit connected to the media module, the display unit comprising:
        an optical receiver configured to receive from a host computer an optical signal modulated to represent media module management information;
        an output display device configured to provide a visible representation of the media module management information;
        a display unit processor configured to interpret the optical signal and to display the media module management information derived there from on the output display device;
    wherein the display unit further comprises a memory, and wherein the display unit processor is further configured to store the media module management information derived from the optical signal in the memory and upon request to drive the output display device with the media module management information obtained from the memory.

14. The media module of claim 13, wherein the display unit attaches as a separate unit to the media module.

15. The media module of claim 13, wherein the display unit is integrally incorporated into the media module.

16. The media module of claim 13, wherein the display unit comprises an independent power supply.

17. The media module of claim 13, wherein the media module management information comprises at least one of (1) remaining capacity of the media module; (2) name of the media module; (3) a job name; (4) a date of access of the media module; (5) operational status of the media module; (6) total capacity of the media module; and (7) one or more barcodes.

18. The media module of claim 13, wherein the media module comprises a media module frame which carries a disk memory device.

19. A display unit for use with a media module of a type which stores electronic data, the display unit comprising:
- an optical receiver configured to receive from a host computer an optical signal modulated to represent media module management information;
- an output display device configured to provide a visible representation of the media module management information;
- a display unit processor configured to interpret the optical signal and to display the media module management information derived there from on the output display device;
- wherein the display unit further comprises a memory, and wherein the display unit processor is further configured to store the media module management information derived from the optical signal in the memory and upon request to drive the output display device with the media module management information obtained from the memory.

20. The media module of claim 19, further comprising a clip configured to attach the display unit as a separate unit to the media module.

21. The media module of claim 19, wherein the display unit is integrally incorporated into the media module.

22. The media module of claim 19, wherein the display unit further comprises a frame configured for insertion into a docking station of the host computer.

23. The media module of claim 19, wherein the display unit comprises an independent power supply.

24. The media module of claim 19, wherein the media module management information comprises at least one of (1) remaining capacity of the media module; (2) name of the media module; (3) a job name; (4) a date of access of the media module; (5) operational status of the media module; (6) total capacity of the media module; and (7) one or more barcodes.

25. A method of operating a computer memory system comprising a media module configured to store electronic data; a host computer configured to accommodate the media module in removable fashion; and a display unit connected to the media module, the method comprising:
- using a host processor to control a read/write operation over an interface between the host computer and the media module and to activate an optical indicator whereby the optical indicator provides a first optical signal depicting transmission of electronic signals over the interface in the read/write operation;
- using the host processor to drive the optical indicator whereby the optical indicator provides a second optical signal modulated to represent media module management information, the first optical signal and the second optical signal not being transmitted over the interface;
- receiving the second optical signal at the display unit and providing at the display unit a visible representation of the media module management information;
- storing the media module management information derived from the second optical signal in a memory and upon request to drive the display unit with the media module management information obtained from the memory.

* * * * *